(12) United States Patent
Vishwanathan et al.

(10) Patent No.: US 8,611,853 B2
(45) Date of Patent: Dec. 17, 2013

(54) SYSTEMS AND METHODS FOR FACILITATING INSTANT COMMERCE BY WAY OF A DATA PATH

(75) Inventors: Kumar K. Vishwanathan, Acton, MA (US); Gurudutt U. Pai, North Andover, MA (US); Rangamani Sundar, Windham, NH (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 30 days.

(21) Appl. No.: 13/473,861

(22) Filed: May 17, 2012

(65) Prior Publication Data
US 2013/0115911 A1    May 9, 2013

Related U.S. Application Data

(60) Provisional application No. 61/556,244, filed on Nov. 6, 2011.

(51) Int. Cl.
*H04M 11/00* (2006.01)

(52) U.S. Cl.
USPC ..... 455/406; 455/414.1; 455/405; 455/422.1; 455/432.3

(58) Field of Classification Search
USPC ................. 455/406, 414.1, 405, 422.1, 432.3
See application file for complete search history.

(56) References Cited

U.S. PATENT DOCUMENTS 6,941,129 B2 *  9/2005  Marce et al. ............... 455/414.1
8,041,341 B1 * 10/2011  Malackowski et al. ....... 455/411

* cited by examiner

*Primary Examiner* — Nghi H Ly

(57) ABSTRACT

An exemplary system includes at least one network device included in a network provider subsystem that provides an access device with access to a content processing subsystem by way of an access network. The network device is configured to receive a data flow from the content provider subsystem and directed to the access device by way of the access network, detect a code snippet embedded in the data flow, modify, based on the code snippet embedded in the data flow, content included in the data flow to activate at least one of an instant offer and an instant payment feature, and forward the modified data flow to the access device, the modified data flow configured to be processed by the access device to present the at least one of the instant offer and the instant payment feature to a user of the access device.

24 Claims, 11 Drawing Sheets

SYSTEMS AND METHODS FOR FACILITATING INSTANT COMMERCE BY WAY OF A DATA PATH

RELATED APPLICATIONS

The present application claims priority under 35 U.S.C. §119(e) to U.S. Provisional Patent Application No. 61/556,244, filed Nov. 6, 2011, which is hereby incorporated by reference in its entirety.

BACKGROUND INFORMATION

A variety of technologies have been developed to facilitate Internet commerce. For example, people accessing web content by way of the Internet are often presented with advertisements for goods and/or services and with ways of providing payment for the goods and/or services by way of the Internet. While conventional technologies such as Internet-based advertisement and payment technologies have successfully facilitated Internet commerce, new and/or improved technologies that better facilitate Internet commerce and/or that provide new and/or improved ways of facilitating Internet commerce are desirable.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Exemplary systems and methods for facilitating instant commerce by way of a data path are disclosed herein. The exemplary systems and methods described herein may facilitate instant commerce in one or more ways not supported by conventional Internet commerce technologies.

As an example, in certain embodiments, a network provider subsystem communicatively positioned along a data path between an access device and a content source may monitor and utilize a data flow along the data path to provide an instant offer to a user of the access device as part of an instant offer service. Examples of instant offers and instant offer services are described herein.

As another example, in certain additional or alternative embodiments, a network provider subsystem communicatively positioned along a data path between an access device and a content source may monitor and utilize a data flow along the data path to provide an instant payment feature for use by a user of the access device to provide an instant payment for a good or a service as part of an instant payment service. Examples of instant payments, instant payment features, and instant payment services are described herein.

As will be become apparent from the following description, instant commerce features and services provided by the systems and methods described herein may facilitate instant commerce by way of a data path in one or more ways not supported by conventional technologies. For example, an instant offer feature and/or service may facilitate a user of an access device receiving an instant offer for a good or a service (e.g., a location-specific and time-sensitive offer published and distributed in real time) in a way that targets the user for reception of the offer with a level of targeting not supported by conventional Internet commerce technologies. In addition, an offer provider (e.g., an advertiser) who provides the instant offer for distribution by an instant offer service provider may be provided with access to real-time status information about the instant offer and/or its distribution, which information may facilitate dynamic, well-informed decision-making by the offer provider in relation to a promotional campaign. As another example, an instant payment feature and/or service may facilitate a user of an access device rendering payment for a good and/or a service without the user ever having to provide payment information (e.g., credit card, bank account, or payment service account information) to the seller of the good and/or the service.

Examples of systems and methods for facilitating instant commerce by way of a data path will now be described in reference to the accompanying drawings. As used herein, the term "product" may generally refer to a good (e.g., digital content) or a service that may be promoted and/or consumed (e.g., purchased) by way of instant commerce as described herein.

Figure 1:
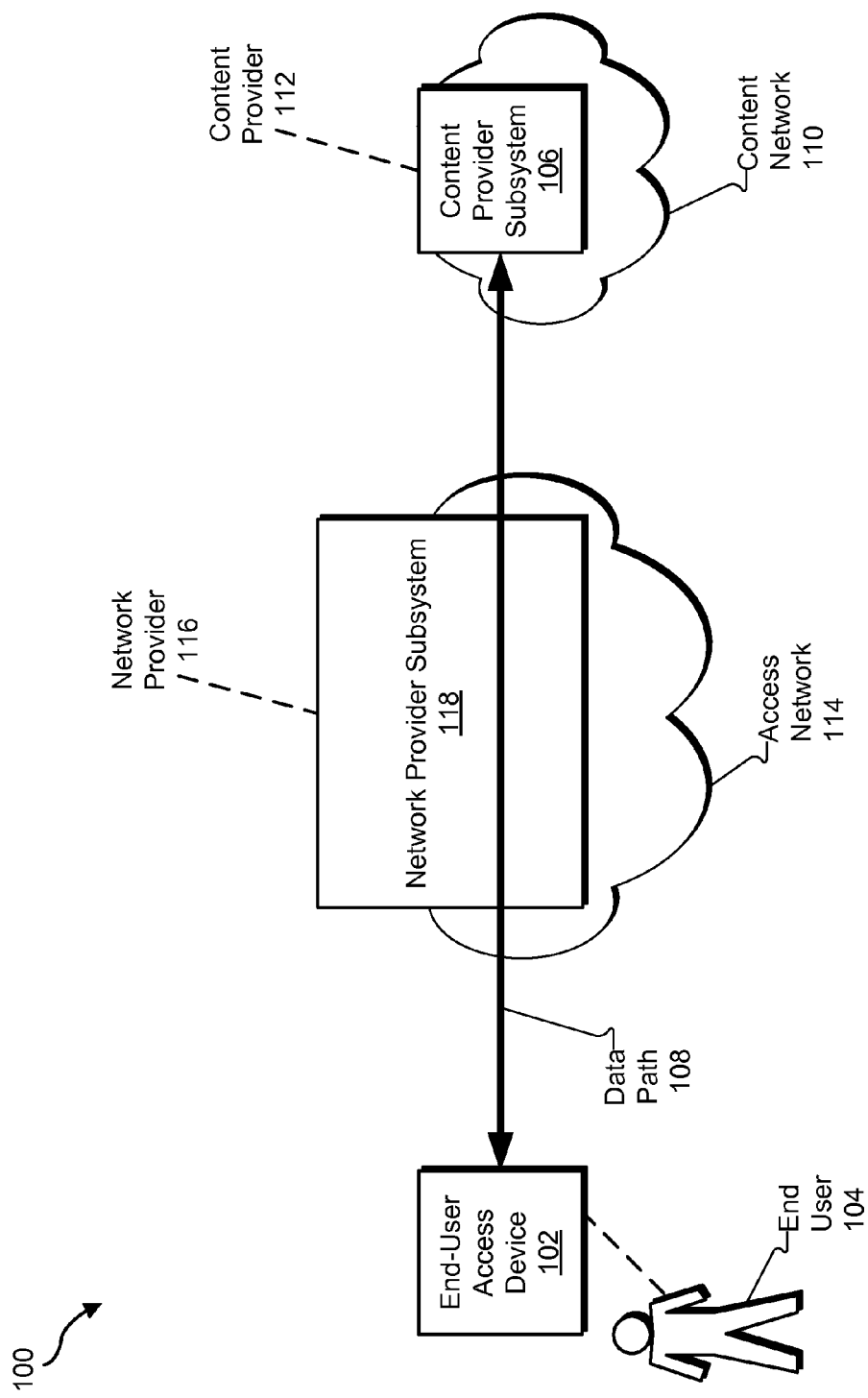
FIG. 1 illustrates an instant commerce facilitating system according to principles described herein.

FIG. 1 illustrates an exemplary instant commerce facilitating system 100 ("system 100"). As shown, system 100 may include an end-user access device 102 ("access device 102") associated with (e.g., operated by) an end user 104 ("user 104"). Access device 102 may be configured to communicate with a content source such as a content provider subsystem 106 by way of a data path 108.

Access device 102 may include any computing device configured to be operated by user 104 and to communicate with content provider subsystem 106 by way of one or more data networks. For example, access device 102 may include a personal computer, a mobile phone device, a smart phone device, a tablet computer, a laptop computer, a gaming console, a television, a set-top box, a digital video recorder, a media player, or any other user computing device configured to connect to and/or to send and receive communications over one or more data networks.

Access device 102 may request and receive content from content provider subsystem 106 by way of data path 108. As used herein, the term "content" may include any digitally represented content that may be transported along data path 108 between content provider subsystem 106 and access device 102. For example, content may include, without limitation, media content, communications content, message content, web content (e.g., data representing a web page), application content (e.g., data representing an application downloading from content provider subsystem 106 to access device 102 and/or content related to an application installed on access device 102), and/or any other content that may be processed by access device 102.

Content provider subsystem 106 may include one or more computing devices (e.g., server devices such as application and/or web server devices) configured to transmit data representing content to access device 102. In system 100, content provider subsystem 106 represents a source of content from which access device 102 may access content. In certain examples, content provider subsystem 106 may be part of a content network 110, which may include the Internet and/or any other data network that includes one or more content sources from which content may be accessed by access device 102 when connected to the data network.

Content provider subsystem 106 may be associated with (e.g., operated by) a content provider 112, which may include any entity that creates and/or provides content for distribution by content provider subsystem 106. For example, content provider 112 may include, without limitation, a web site operator, an application publisher, and/or a social networking site operator.

Access device 102 may be configured to communicate with content provider subsystem 106 (and/or with other sources of content connected to content network 110) by way of an access network 114 provided by a network provider 116. Access network 114 may include one or more data networks configured to provide one or more connections between access device 102 and content provider subsystem 106 and/or between access device 102 and any other sources of content communicatively connected to content network 110. Access network 114 may include, for example, an Internet service provider ("ISP") network, a digital subscriber line ("DSL") network, a mobile data network (e.g., a mobile broadband data network), a mobile phone network (e.g., a cellular phone network, a 3G network, a 4G network, a Long Term Evolution ("LTE") network, a Global System for Mobile Communications ("GSM") network, a Code Division Multiple Access ("CDMA") network, a Time Division Multiple Access ("TDMA") network, an Evolution Data Optimized Protocol ("EVDO") (e.g., "1xEVDO") network, a radio transmission technologies network (e.g., One Times Radio Transmission Technology ("1xRTT")), etc.), a WiMax network, a satellite media network (e.g., a broadcasting network, a terrestrial media broadcasting network), a packet core data network, a subscriber network, a provider-specific network, and/or any other data network or set of data networks capable of providing communicative connections between access device 102 and content provider subsystem 106.

Network provider 116 may comprise any entity that provides access network 114. For example, network provider 116 may include an operator of access network 114, such as a mobile phone network provider, an Internet service provider, and/or a service carrier and/or provider (e.g., a wireless carrier, a mobile phone service carrier, a network service provider, etc.).

Network provider 116 may provide and/or operate a network provider subsystem 118 configured to provide access network 114. Network provider subsystem 118 may include one or more network element devices (e.g., one or more gateways, routers, servers (e.g., DNS servers and/or billing management servers), etc.) operated by network provider 116 and configured and/or enhanced to perform one or more operations to provide access network 114 and/or to facilitate instant commerce by way of access network 114 in any of the ways described herein. Network provider subsystem 118 may be configured to manage (e.g., track, allow, disallow, route, etc.) network traffic (i.e., data) that flows through access network 114.

In certain embodiments, network provider subsystem 118 may be configured to provide one or more services by way of access network 114. For example, network provider subsystem 118 may be configured to provide a network access service (e.g., a wireless data access service), mobile phone service, mobile data network service (e.g., a 3G or 4G data network service), voice service, messaging service, and/or another service by way of access network 114. In certain examples, user 104 may subscribe to one or more services provided by network provider subsystem 118.

Figure 2:
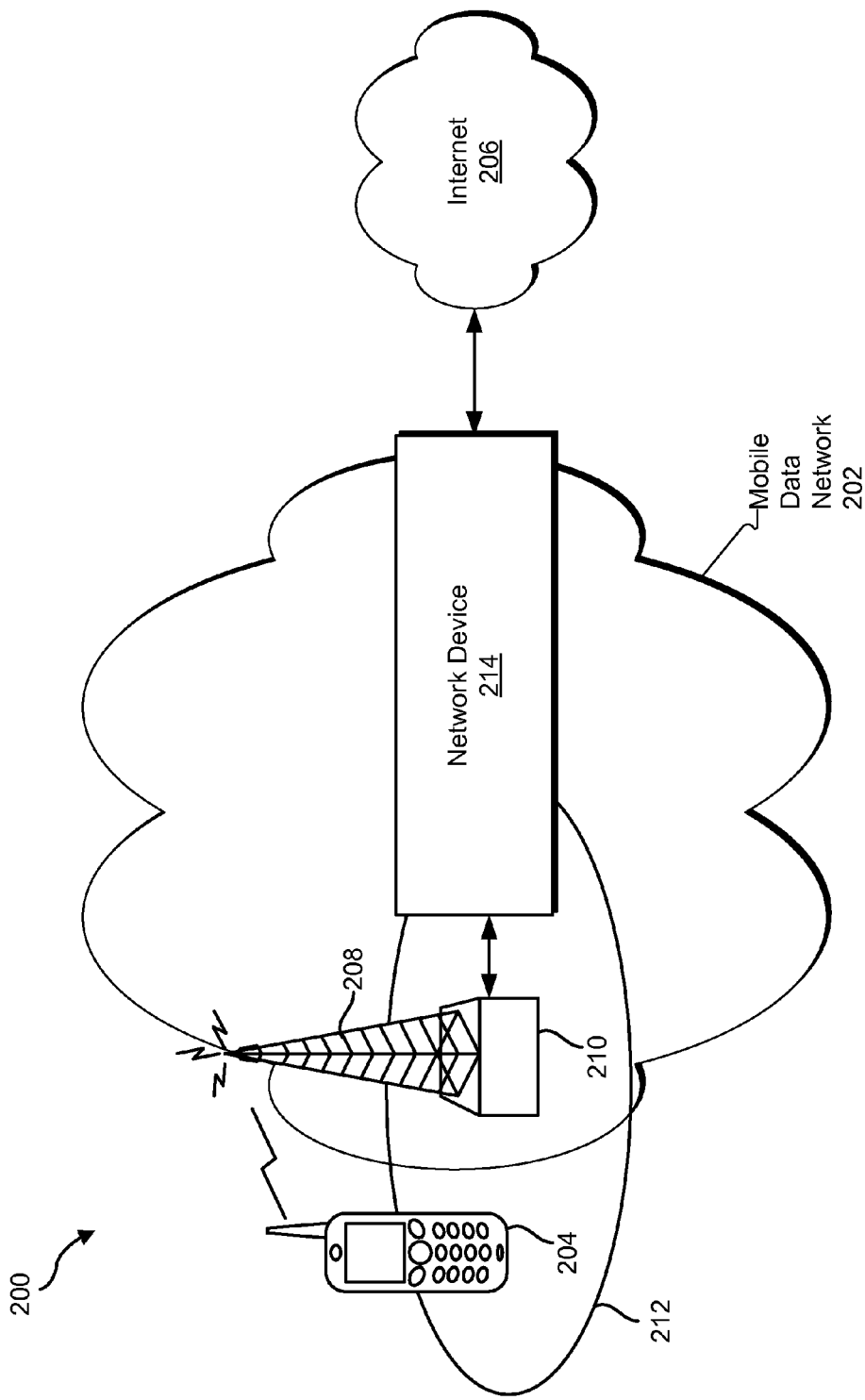
FIG. 2 illustrates an exemplary implementation of the system of FIG. 1 according to principles described herein.

To illustrate, FIG. 2 shows an exemplary implementation 200 of system 100 in which access network 114 comprises a mobile data network 202 accessible by an access device in the form of a mobile device 204, which may be operated by a subscriber to a service provided by way of mobile data network 202. In implementation 200, mobile data network 202 provides an access connection and/or service by which a mobile device 204 may connect to the Internet 206 and communicate with a content source such as content provider subsystem 106 by way of the Internet to access content. Network provider subsystem 118 may include one or more network element devices configured to provide mobile data network 202. For example, network provider subsystem 118 may include, without limitation, an antenna 208 and base station 210 configured to send and receive wide area wireless communications to/from mobile device 204 physically located within a geographic cell 212, as well as a network device 214 communicatively connected to base station 210 and configured to provide an interface to the Internet 206. Network device 214 may comprise any suitable network element device and may be communicatively positioned at any suitable location within mobile data network 202 at which a data flow between mobile device 204 and an Internet device passes through network device 214.

Returning to FIG. 1, data path 108 may traverse one or more data networks. In the example illustrated in FIG. 1, data path 108 traverses access network 114. Accordingly, network provider subsystem 118 is positioned along data path 108 between access device 102 and content provider subsystem 106 and therefore configured to provide one or more features and/or services to user 104 and/or content provider 112 to facilitate instant commerce between user 104 and content provider 112. Because of the position of network provider subsystem 118 along data path 108, all data traffic flowing on data path 108 passes through network provider subsystem 118, which may be configured to monitor and/or process the data flow to facilitate instant commerce as described herein.

For example, a downstream data flow from content provider subsystem 106 to access device 102 by way of data path 108 passes through network provider subsystem 118, which may be configured to receive, inspect, modify, and/or forward the modified data flow to access device 102. The modified data flow may be configured to be processed by access device 102 in a way that presents user 104 with a feature and/or service configured to facilitate instant commerce. Additionally, an upstream data flow from access device 102 to content provider subsystem 106 along data path 108 passes through network provider subsystem 118, which may be configured to receive, inspect, modify, and/or forward the modified data flow to content provider subsystem 106. The modified data flow may be configured to be processed by content provider subsystem 106 in a way that further facilitates instant commerce.

Figure 3:
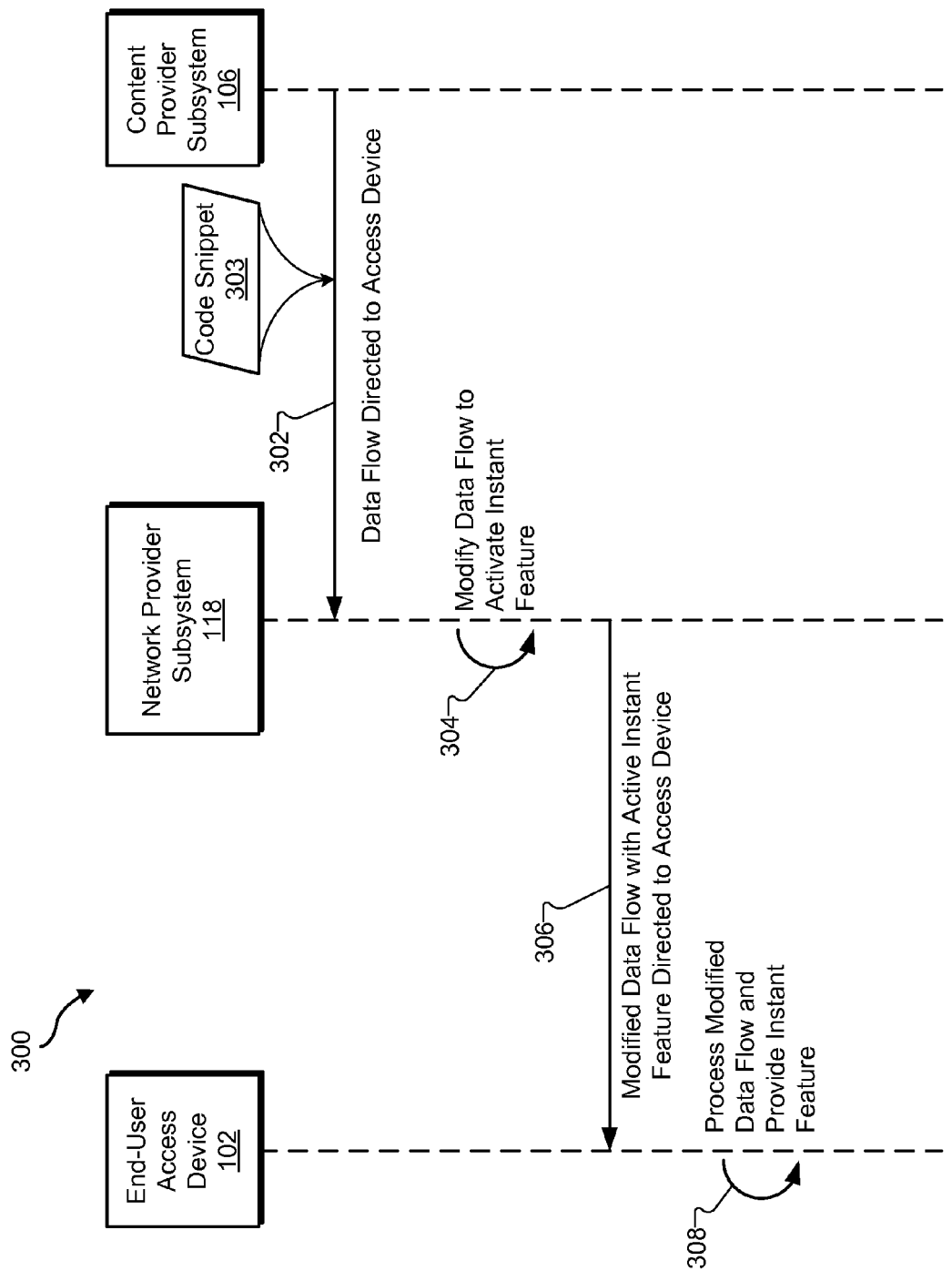
FIG. 3 illustrates an exemplary method of processing a data flow according to principles described herein.

FIG. 3 illustrates an exemplary method 300 of processing a data flow along data path 108. In step 302, content provider subsystem 106 may transmit a data flow directed to access device 102. The data flow may include data representative of content such as web content, application content, social networking content, and/or any other content that may be transmitted by content provider subsystem 106 and directed to access device 102.

In certain examples, content provider subsystem 106 may insert a code snippet into the data flow. Content provider subsystem 106 and/or content provider 112 may have obtained the code snippet from network provider subsystem 118 and/or network provider 116 previously. For instance, content provider 112 may have obtained the code snippet as part of registration of content provider subsystem 106 and/or content provider 112 for participation in an instant commerce service provided by network provider subsystem 118. The code snippet may include any marker, token, computing code (e.g., script), and/or combination thereof configured to be detected and/or processed by network provider subsystem 118 and/or access device 102 to provider or otherwise facilitate an instant commerce feature and/or service. FIG. 3 illustrates a code snippet 303 embedded by content provider subsystem 106 in the data flow of step 302. Examples of code snippets are described herein.

In step 304, network provider subsystem 118 receives, detects, and modifies the data flow to activate an instant commerce facilitating feature ("instant feature" or "instant commerce feature"). Network provider subsystem 118 may detect and modify the data flow in any way that is suitable to activate an instant feature. For example, network provider subsystem 118 may monitor the data flow for an embedded code snippet, detect a code snippet in the data flow, and modify the content of the data flow based on the code snippet. The modification may include activating executable code in the code snippet (e.g., by un-commenting commented code by removing computing code comment symbols to re-label code included in the code snippet from comment type code to executable type code), adding content to the data flow (e.g., by embedding content in the data flow), and/or any other way of modifying content of the data flow. Examples of modifying content of a data flow based on an embedded code snippet are described herein.

In step 306, network provider subsystem 118 forwards the modified data flow with the active instant feature to access device 102. Network provider subsystem 118 may forward the modified data flow to access device 102 in any way that is suitable to deliver the data flow and the active instant feature included therein to access device 102. The modified data flow is configured to be processed by access device 102 such that the instant feature is utilized by access device 102 and/or presented to user 104.

In step 308, access device 102 processes the modified data flow and provides the instant feature. For example, access device 102 may process the data flow and present an instant offer to user 104. As another example, access device 102 may process the data flow and present an instant payment feature to user 104.

FIG. 3 illustrates processing of a downstream data flow from content provider subsystem 106 to access device 102 by way of data path 108. One or more of the principles described herein in relation to processing a downstream data flow may apply to processing an upstream data flow from access device 102 to content provider subsystem 106 by way of data path 108. For example, access device 102 may generate and transmit an upstream data flow that includes an instant commerce code snippet to content provider subsystem 106, and network provider subsystem 118 may receive and process the upstream data flow to provide and/or further an instant commerce feature in any of the ways described herein.

Examples of instant offer and payment features and/or services will now be described in more detail.

Figure 4:
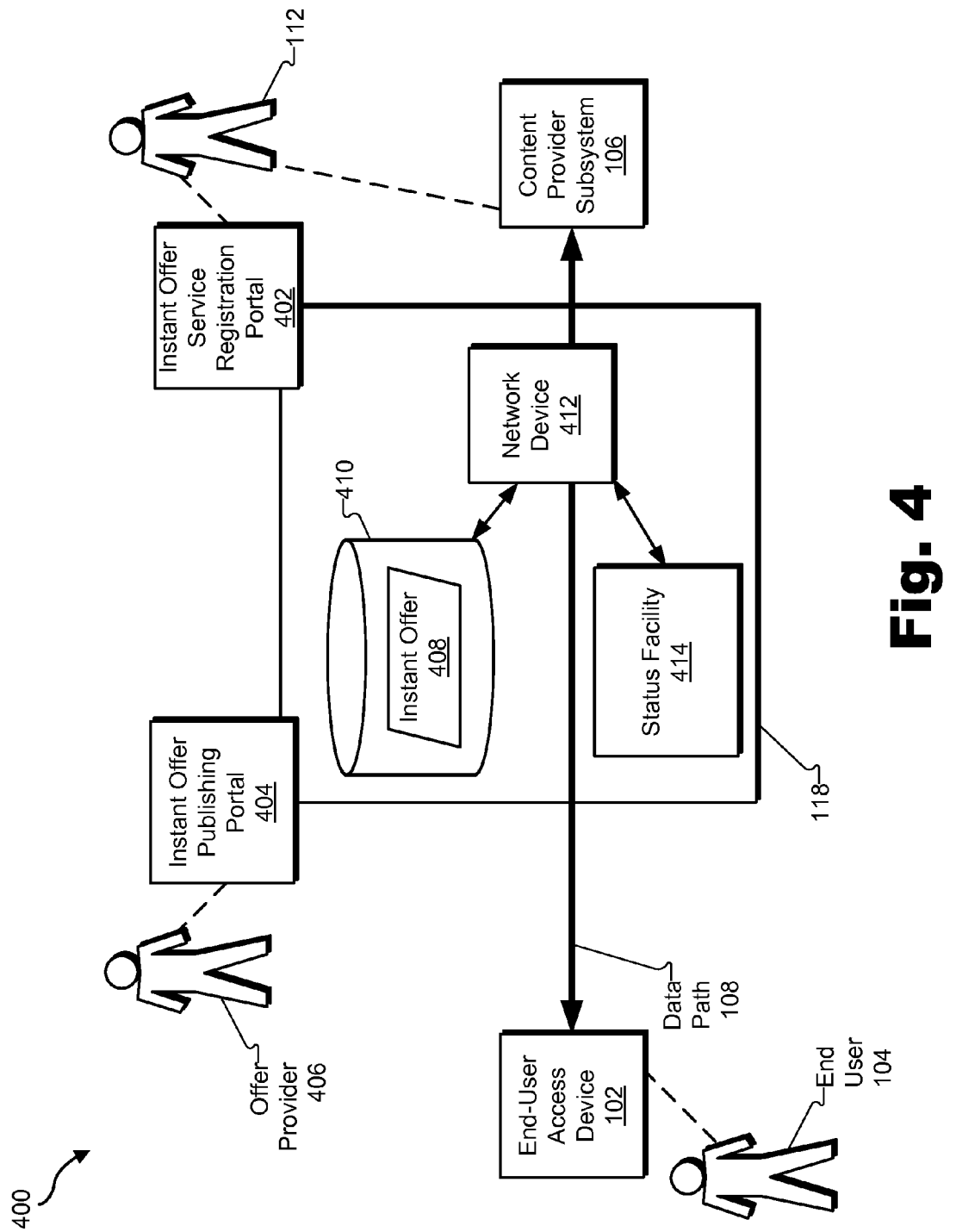
FIG. 4 illustrates an exemplary instant offer system according to principles described herein.

With respect to instant offer features and/or services, FIG. 4 illustrates an exemplary instant offer system 400 ("system 400"). As shown, content provider subsystem 106 operated by content provider 112, and access device 102 operated by user 104 may communicate with one another by way of data path 108. Network provider subsystem 118, which may be operated by network provider 116, is positioned along data path 108 between access device 102 and content provider subsystem 106.

Network provider subsystem 118 may be configured to provide an instant offer service registration portal 402 ("registration portal 402"). Through registration portal 402, content provider 112 may register to participate in an instant offer service provided by network provider subsystem 118. By registering to participate in the instant offer service, content provider 112 may indicate to network provider 116 that content provider 112 is willing to allow network provider 116 to distribute instant offers together with content provided by content provider 112 to users of access network 114.

Registration portal 402 may provide one or more service registration tools for access and use by content provider 112 to register to participate in the instant offer service. For example, registration portal 402 may provide tools for use by content provider 112 to define one or more offer selection conditions that are to be followed by network provider 116 and/or network provider subsystem 118 to select instant offers for distribution together with content provided by content provider subsystem 106 to one or more users (e.g., user 104) of access network 114. Using such tools, content provider 112 may specify offer selection conditions such as types of instant offers and/or products being offered to be included or excluded from distribution together with content provided by content provider subsystem 106, particular promoters and/or product sellers whose offers and/or products are to be included or excluded from distribution together with content provided by content provider subsystem 106, priorities for placement of instant offers by promoter, seller, and/or product type, and/or any other conditions that may be used by network provider subsystem 118 to select particular instant offers for distribution together with content provided by content provider subsystem 106.

In certain examples, one or more service registration tools provided by registration portal 402 may allow content provider 112 to register to participate in a regular advertisement distribution service and/or in an instant offer distribution service. If content provider 112 registers for both services, in defining offer selection conditions, content provider 112 may specify that instant offers are to be prioritized over regular advertisements for distribution together with content provided by content provider subsystem 106. In some examples, network provider 116 may agree to provide different (e.g., relatively higher) compensation for distribution of instant offers as compared to compensation provided for distribution of regular advertisements together with content provided by content provider subsystem 106.

Network provider subsystem 118 may receive registration information from content provider 112 by way of registration portal 402 and process the information to register content provider 112 and/or content provider subsystem 106 to participate in the instant offer service provided by network provider subsystem 118. As part of the registration, network provider subsystem 118 and/or network provider 116 may provide content provider 112 with information that may be used by content provider 112 and/or content provider subsystem 106 to participate in the service. In certain embodiments, for example, network provider subsystem 118 may provide a code snippet to content provider 112 by way of registration portal 402. The code snippet may include data representing an agreed to arrangement between network provider 116 and content provider 112 for participation in the service, including data representing one or more offer selection conditions defined by content provider 112 during registration.

Content provider 112 may add data representing the code snippet to content distributed by content provider subsystem 106. For example, content operator 12 may configure content provider subsystem 106 to insert data representing the code snippet into content distributed by content provider subsystem 106. To illustrate, content provider 112 may comprise a website operator that may configure content provider subsystem 106 to embed data representing the code snippet into one or more web pages of the website operated by content provider 112. To illustrate another example, content provider 112 may comprise an application publisher that may configure content provider subsystem 106 to embed the code snippet into an application and/or into application data provided by content provider subsystem 106.

Accordingly, content transmitted by content provider subsystem 106 to access device 102 by way of data path 108 may include data representing the code snippet, and network provider subsystem 118 may be configured to detect and process the code snippet to provide an instant offer feature and/or service together with the content provided by content provider subsystem 106. This may include network provider subsystem 118 using information included in the code snippet to select an instant offer based on one or more offer selection conditions specified by the code snippet and to modify content included in a data flow from content provider subsystem 106 to access device 102 to embed data representing a select instant offer (e.g., instant offer data and/or a link to instant offer data) in the data flow for reception and processing by access device 102. The access device 102 may process the modified data flow and present the instant offer to user 104.

Network provider subsystem 118 may be further configured to provide an instant offer publishing portal 404 ("publishing portal 404"), which may comprise a web portal in some embodiments. Through publishing portal 404, an offer provider 406 may provide an instant offer to network provider subsystem 118 for distribution to one or more users of access network 114. By publishing an instant offer to publishing portal 404, offer provider 406 may indicate to network provider 116 that offer provider 406 wishes for the instant offer to be distributed by network provider 116 to users of access network 114.

An instant offer may include content that may be distributed in real time or near real time by network provider subsystem 118 to access device 102 and processed by access device 102 to present an offer to user 104. In some examples, an instant offer may offer a product to user 104 (e.g., for purchase, lease, and/or other use) and/or comprise a coupon or other promotion for a product.

To illustrate, an instant offer may comprise a time-sensitive offer for a product. As an example, the instant offer may be defined and published for selective distribution to users within a specified valid time period. In certain examples, the offer may be an instant offer in that the offer has a short lifetime. In other words, the time period during which the offer is valid is very short (e.g., an hour or half an hour or less). Additionally or alternatively, the offer may be an instant offer in that the lifetime of the offer may begin immediately when the instant offer is published by offer provider 406 to and received by network provider subsystem 118 by way of publishing portal 404. Network provider subsystem 118 may be configured to respond to a reception of an instant offer through portal 404 by distributing the instant offer to one or more users of access network 114 in real time or near real time.

Additionally or alternatively, an instant offer may comprise a location-specific offer for a product. That is, the instant offer may be defined and published for selective distribution to users who are physically located within a specified geographic location. In certain examples, the offer may be defined for distribution to users who are physically located in a position to redeem the offer within the lifetime of the offer.

To illustrate one example, offer provider 406 may comprise a theater operator that operates a movie theater located at a particular geographic location. The theater operator may define and publish an instant offer to offer half-price admission to a movie showing that is scheduled to begin in thirty minutes at the movie theater. The theater operator may access publishing portal 404 to create and publish the instant offer to network provider 116 for distribution to users of access network 114.

Through publishing portal 404, the theater operator may define a promotional campaign for the instant offer. For example, the theater operator may specify that the offer will last for thirty minutes and is to be distributed to users of access network 114 who are physically located within thirty minutes travel time of the location of the movie theater. In this manner, the instant offer is a location-specific and time-sensitive offer.

Publishing portal 404 may provide one or more publication tools for access and use by offer provider 406 to define a promotional campaign for an instant offer. The promotional campaign may include data representing an instant offer to be distributed by network provider subsystem 118 and/or one or more offer distribution conditions to be followed by network provider subsystem 118 to selectively distribute the instant offer. Accordingly, using tools provided in publishing portal 404, offer provider 406 may define a promotional campaign that includes data representing an instant offer and one or more offer distribution conditions that will govern the distribution of the instant offer.

The offer distribution conditions may specify any criteria that are to be satisfied before network provider subsystem 118 distributes the instant offer to a user of access network 114. For example, the offer distribution conditions may specify geographic location requirements of users and/or access devices (e.g., that access device 102 be physically located within a certain distance, travel time, or other range of the location of the movie theater in the above example), lifetime and/or timing requirements for distribution of the instant offer (e.g., that the distribution begin immediately and last no more than thirty minutes in the above example), user preferences, and/or activity requirements of access device 102 (e.g., that access device 102 is performing a certain process, accessing certain content or category of content (e.g., a web page or a web page that fits within a certain category), executing a certain application or category of application (e.g., an Internet search engine, a web browser application, a map application, a social network application, etc), and/or any other criteria that will govern selective distribution of the instant offer to target certain users. Accordingly, offer provider 406 may use tools in publishing portal 404 to define any suitable conditions to govern the distribution of an instant offer by network provider subsystem 118. This may allow offer provider 406 to target potential customers based on a variety of defined offer distribution conditions.

Network provider subsystem 118 may be configured to provide feedback related to a proposed, active, and/or completed promotional campaign to offer provider 406 by way of publishing portal 404. In certain embodiments, the feedback may be immediate feedback provided in real time and may indicate, reflect, and/or be based on a current status of access network 114. The current status of access network 114 may include current geographic locations of access devices and/or current processing activities of access devices, for example. Network provider subsystem 118 may determine such current statuses in any suitable way, including by analyzing network data traffic associated with the access devices. For example, network provider subsystem 118 may analyze network data traffic that flows through network provider subsystem 118 to determine current location and/or processing activities of access devices (e.g., by analyzing network data traffic associated with access device 102 to determine that access device 102 is actively being interacted with by user 104, that access device 102 is executing a specified application, that access device 102 is accessing specified content such as a particular website or data for a particular application, etc.).

To illustrate, network provider subsystem 118 may receive, by way of publishing portal 404, data representing offer distribution conditions defined by offer provider 406 for an instant offer. In response to receiving the offer distribution conditions, network provider subsystem 118 may access network status data maintained by network provider subsystem 118 and indicative of the current status of access network 114. Network provider subsystem 118 may compare the status information to the offer distribution conditions, and based on the comparison determine a targetable audience for the instant offer. The targetable audience may include a group of users of access network 114 that are currently reachable and that currently satisfy the offer distribution conditions and thereby qualify for reception of the instant offer.

Network provider subsystem 118 may provide feedback representing the targetable audience to offer provider 406 by way of publishing portal 404. For example, network provider subsystem 118 may present data indicating a size of the current targetable audience (e.g., twenty-thousand users) in publishing portal 404 in response to the user inputting the offer distribution conditions.

Offer provider 406 may consider the feedback provided by network provider subsystem 118 by way of publishing portal 404 and use the information to customize the promotional campaign to fit the business needs of the offer provider 406. For example, the feedback may indicate that the targetable audience includes twenty-thousand users of access network 114. Based on this feedback, offer provider 406 may adjust the offer distribution conditions through publishing portal 404 to attempt to increase or decrease the size of the targetable audience to better fit the needs of offer provider 406. Immediate feedback may again be provided in publishing portal 404 and the process repeated to assist offer provider 406 to customize the promotional campaign in a dynamic and well-informed manner.

Network provider subsystem 118 may be configured to apply a rate schedule to charge offer provider 406 for distribution of an instant offer. For example, network provider subsystem 118 may be configured to charge offer provider 406 different rates for different sizes of targetable audiences. For instance, offer provider 406 may be charged a higher rate to reach a larger targetable audience. Alternatively, offer provider 406 may be charged a higher rate to reach a smaller targetable audience with a higher degree of targeting being provided by network provider subsystem 118 to target the smaller audience for distribution of the instant offer based on offer distribution conditions defined by offer provider 406 and current network status information maintained by network provider subsystem 118.

Network provider subsystem 118 may provide feedback representing the determined rate for distribution of the instant offer to the targetable audience to offer provider 406 by way of publishing portal 404. For example, network provider subsystem 118 may present data indicating a rate that will be charged to distribute the instant offer to the determined current targetable audience in publishing portal 404 in response to the user inputting the offer distribution conditions for the instant offer. Offer provider 406 may consider this feedback provided by network provider subsystem 118 by way of publishing portal 404 and use the information as described above to customize the promotional campaign to fit the business needs of the offer provider 406.

In this or a similar manner, network provider subsystem 118 may provide offer provider 406 with immediate, real time feedback that is based on current network status information, and with a significant degree of flexibility in using the feedback to create, define, and/or modify a promotional campaign to fit the needs of offer provider 406. Accordingly, offer provider 406 may define and propose a promotional campaign to network provider subsystem 118, and network provider subsystem 118 may provide instant feedback based on network analytics to offer provider 406 about the proposed promotional campaign, such as an indication of a size of a targetable audience that will be reached by the promotional campaign.

Because network provider subsystem 118 is positioned along data path 108, network provider subsystem 118 is able to collect and maintain a wealth of useful information related to use, status, and users of access network 114, and to leverage this information to provide tools for use by offer provider 406 to customize instant offer promotional campaigns and to selectively distribute instant offers in a highly targeted manner. In particular, in embodiments in which access network 114 comprises mobile data network 202, network provider subsystem 118 is able to leverage network status information indicating current geographical locations of user access devices, current connection statuses of user access devices, and current processing activities of user access devices (e.g., that access device 104 is accessing a particular application and/or particular web content, and thus the total number of access devices that are currently active in using a particular application, web site, or other content that contains an instrumented code snippet). In addition, network provider subsystem 118 may be configured to access subscriber information for users of access network 114, including demographic, historical usage, and/or billing information of the users, and to use such information to target one or more users for reception of an instant offer.

Network provider subsystem 118 may store data representing a promotional campaign received through publishing portal 404. For example, network provider subsystem 118 may store data representing an instant offer 408 in a repository 410 of instant offers. Network provider subsystem 118 may also store data representing offer distribution conditions for instant offer 408. Instant offers included in repository 410 are available for selective distribution by network provider subsystem 118. In certain example, network provider subsystem 118 may distribute an instant offer to all users of access network 114 that satisfy the offer distribution conditions for the instant offer immediately in real time or near real time in response to network provider subsystem 118 receiving the instant offer through publishing portal 404. In some examples, network provider subsystem 118 may be further configured to selectively distribute the instant offer to other users of access network 114 throughout the predefined time period during which the instant offer is valid, such as in response to the statuses of users changing to satisfy the offer distribution conditions. For example, in the theater example described above, during the valid time period of the instant offer, an access device of a user may move within a geographic location that satisfies the conditions of the instant offer, and network provider subsystem 118 may respond by pushing the instant offer to the access device.

Network provider subsystem 118 may be configured to dynamically adjust offer distribution conditions based on changing circumstances. In the theater example described above, for example, a travel time condition may be dynamically adjusted with the passage of time. For instance, the initial thirty-minute travel time range condition described above may be dynamically adjusted by network provider subsystem 118 to a fifteen-minute travel time range condition when fifteen minutes are remaining in the valid time period for the instant offer.

Network provider subsystem 118 may include a network device 412 positioned along data path 108 between access device 102 and content provider subsystem 106 as shown in FIG. 4. Content provider subsystem 106 may transmit content to access device 102. A data flow carrying the content may traverse data path 108 and pass through network device 412. Network device 412 may receive the data flow and determine that the data flow is associated with a registrant of an instant offer service. The determination may be made in any suitable way, including by network device 412 detecting a code snippet embedded in the data flow and determining that the code snippet indicates that the data flow is associated with a registrant of the instant offer service.

Network device 412 may then determine whether repository 410 contains an instant offer that can be matched to the data flow based on predefined conditions. In certain examples, network device 412 may process the code snippet embedded in the data flow to identify one or more offer selection conditions. Network device 412 may then search repository 410 for an instant offer that satisfies the offer selection conditions.

If a match is found, network device 412 may compare one or more offer distribution conditions for the instant offer with current network status information, which may be maintained by status facility 414, to determine whether the offer distribution conditions are satisfied by the current status of access device 102. If the conditions are satisfied (e.g., access device 102 is located within a specified geographic location, is executing a specified application, and/or is accessing specified content), network device 412 may modify the data flow to include data representing the instant offer and forward the modified data flow to access device 102. In some examples, the modification may include embedding data representing the instant offer in the data flow as specified by the code snippet. Access device 102 may receive and process the modified data flow and present the instant offer to user 104 (e.g., as part of a current active data session between access device 102 and content provider subsystem 106 by way of data path 108).

In a similar manner, network device 412 may distribute the instant offer to each access device connected to access network 114 and that satisfies the conditions for distribution of the instant offer. Network device 412 may be configured to monitor instant offer distribution activities such as transmission to access devices, presentation by access devices, interaction by users with the instant offers (e.g., users clicking on selectable options in the instant offers), etc. Network device 412 may provide real time feedback representing such distribution activities to offer provider 406 by way of publishing portal 404. Accordingly, offer provider 406 may be informed in real time of current distribution activities.

While certain exemplary embodiments described herein allow content providers 112 to opt in to allow network provider 116 to associate instant offers with content provided by the content providers 112, in certain alternative embodiments, network device 412 may be configured to push an online offer to all access devices connected to access network 114 when the online offer is distributed and/or during a valid time period for the instant offer, without content providers 112 opting in to expressly allow instant offers to be associated with the content provided by the content providers 112. Such non-selective distribution (non-selective in that the instant offers may be associated with content provided by any content providers whether or not the content providers have opted in) may be performed in any suitable way, such as by modifying a data flow to include data representing a pop-up or overlay graphical user interface configured for overlaid display on content (e.g., web content) provided by content provider subsystem 106. This non-selective distribution may reach a large targetable audience. In certain examples, users of access network 114 may be allowed to opt in or opt out of receiving instant offers, or to specify conditions to govern when the users will allow or block instant offers. For example, a user may want to receive instant offers only when the user is actively using a particular social network application or only when the particular social network application is active on access device 102. In such examples, end-user-specified conditions may be given precedence over offer distribution conditions specified by offer provider 406.

Figure 5:
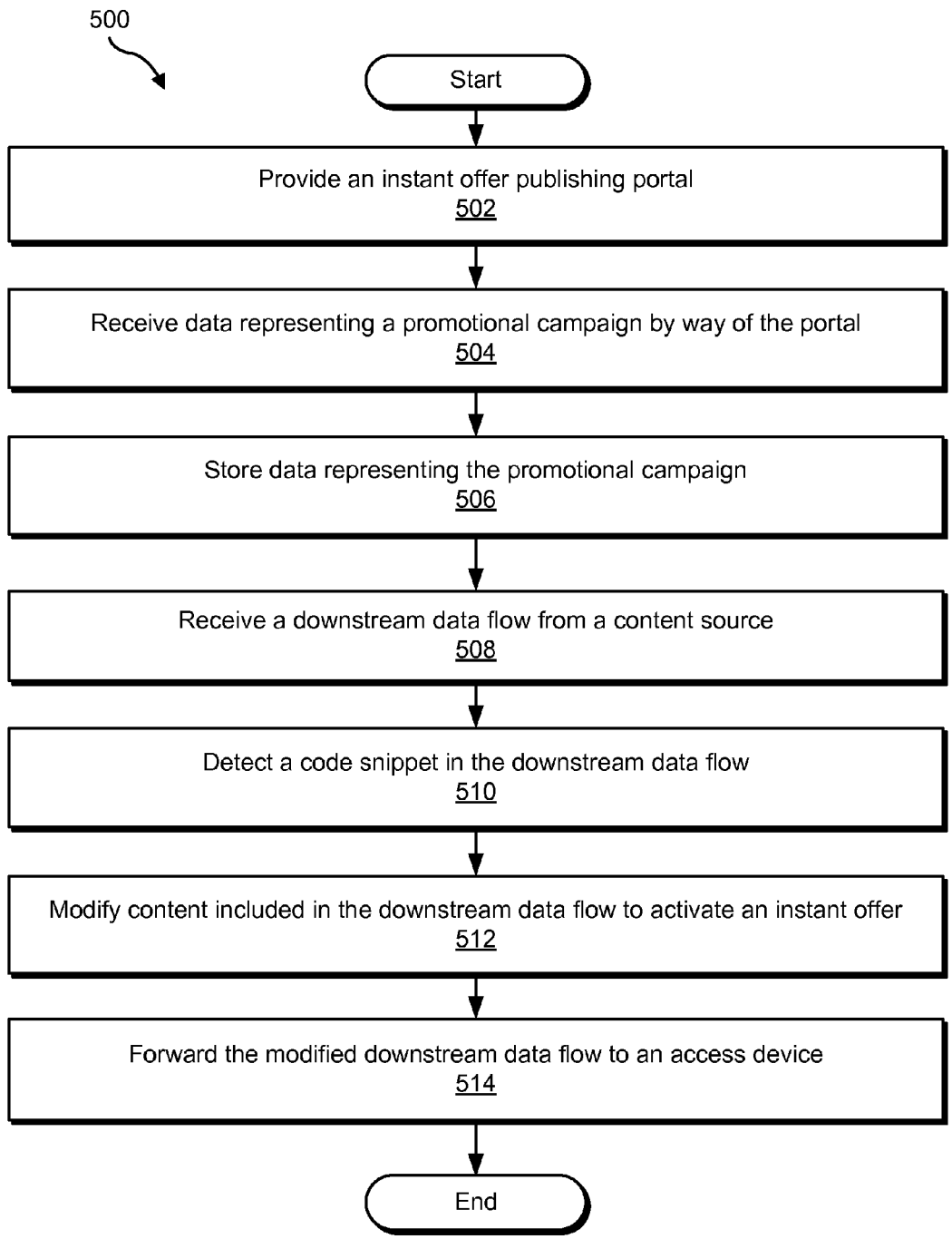
FIG. 5 illustrates an exemplary instant offer method according to principles described herein.

FIG. 5 illustrates an exemplary instant offer method 500. While FIG. 5 illustrates exemplary steps according to one embodiment, other embodiments may omit, add to, reorder, combine, and/or modify any of the steps shown in FIG. 5. One or more of the steps shown in FIG. 5 may be performed by network provider subsystem 118 and/or one or more components thereof.

In step 502, network provider subsystem 118 provides an instant offer publishing portal, such as described herein.

In step 504, network provider subsystem 118 receives data representing a promotional campaign by way of the portal. As described above, the promotional campaign may include an instant offer and one or more offer distribution conditions defined by an offer provider.

In step 506, network provider subsystem 118 stores data representing the promotional campaign, such as described herein.

In step 508, network provider subsystem 118 receives a downstream data flow from a content source such as content provider subsystem 106. As described above, the data flow may be transmitted by content provider subsystem 106 and directed to access device 102.

In step 510, network provider subsystem 118 detects a code snippet embedded in the downstream data flow. As described herein, the code snippet may indicate that the data flow is associated with a content source that is registered to participate in an instant offer service provided by network provider subsystem 118.

In step 512, network provider subsystem 118 modifies content included in the downstream data flow to activate an instant offer. The modification may be performed in any of the ways described herein and may include embedding the instant offer included in the promotional campaign received by network provider subsystem 118 in step 504 in the data flow.

In step 514, network provider subsystem 118 forwards the modified downstream data flow to the access device to which the content source directed the downstream data flow, such as described herein. The modified data flow is configured to be processed by the access device to present the instant offer to a user of the access device.

In certain embodiments, a code snippet included in a data flow from content provider subsystem 106 to access device 102 may include executable code (e.g., a script) that may be executed by access device as instrumented code within an application, web page, or other content. The executable code may be configured to direct access device 102 to periodically poll network device 412 or another device included in network provider subsystem 118 (e.g., an instant offer server device) for instant offers (e.g., updated instant offers) that may match predefined conditions for distribution to access device 102. If a match is found, network device 412 may provide the matching instant offer to access device 102, which may process and present the instant offer within the application, web page, or other content.

To illustrate, a web page may be displayed by access device 102. The web page may contain an instant offer presented therein. The web page may remain open on access device 102 for a period of time. The code snippet for instant offers within the web page may be executed and poll network device 412 for any updated instant offers. Network device 412 may search repository 410 for updated instant offers that match conditions for distribution to access device 102. If a match is found, network device 412 may provide the matching instant offer to access device 102, which may update the web page to include the new instant offer, without the web page having to be reloaded by user input or other activity.

Figure 6:
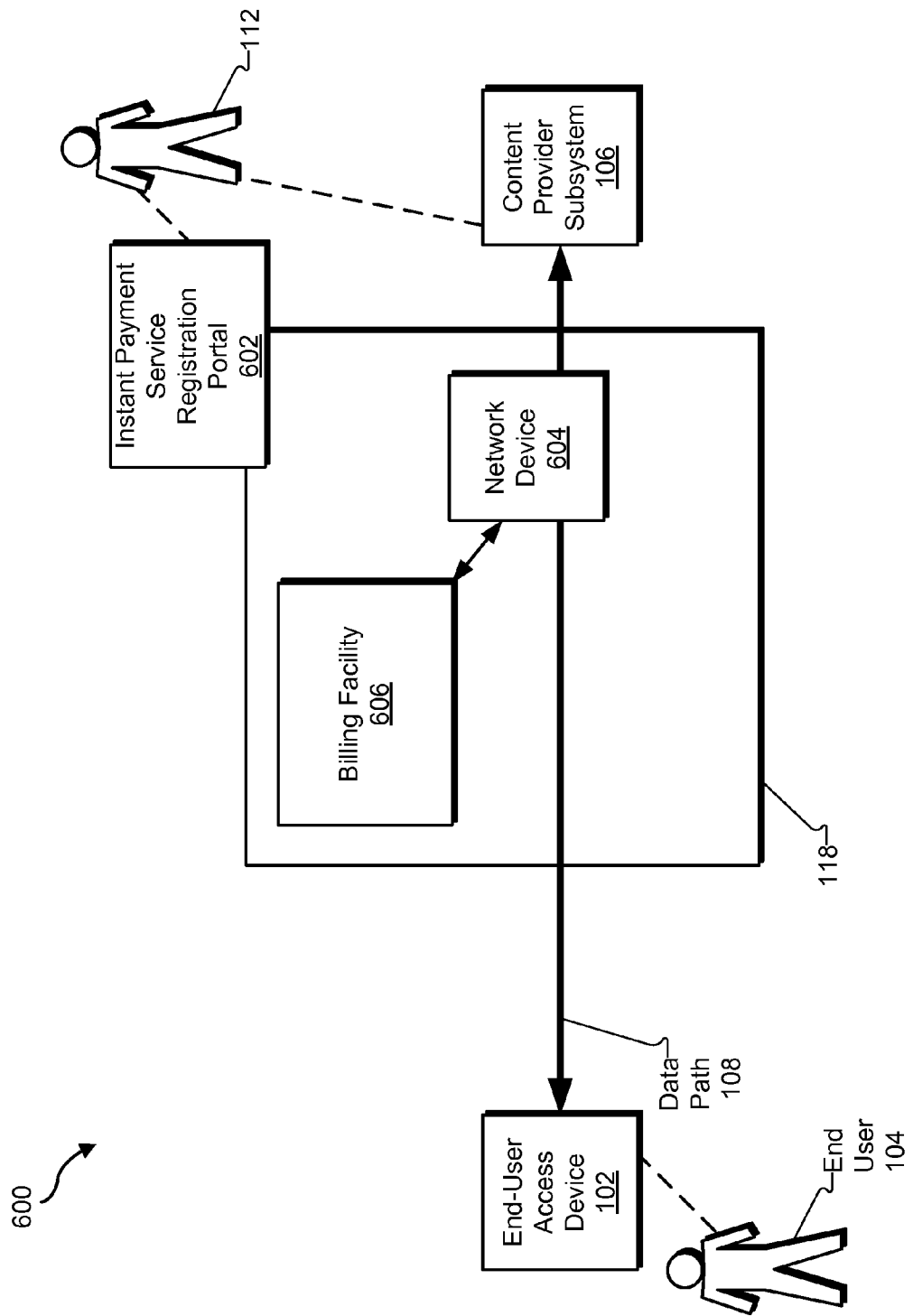
FIG. 6 illustrates an exemplary instant payment system according to principles described herein.

Turning now to instant payment features and/or services, FIG. 6 illustrates an exemplary instant payment system 600 ("system 600"). As shown, content provider subsystem 106 operated by content provider 112, and access device 102 operated by user 104 may communicate with one another by way of data path 108. Network provider subsystem 118, which may be operated by network provider 116, is positioned along data path 108 between access device 102 and content provider subsystem 106.

Network provider subsystem 118 may be configured to provide an instant payment service registration portal 602 ("registration portal 602"). Through registration portal 602, content provider 112 may register to participate in an instant payment service provided by network provider subsystem 118. By registering to participate in the instant payment service, content provider 112 may indicate to network provider 116 that content provider 112 is willing to allow network provider 116 to function as a third-party billing service to collect payment from user 104 and provide payment to content provider 112 to facilitate a transaction between user 104 and content provider 112 (e.g., a transaction in which user 104 purchases a product from content provider 112), without user 104 having to provide payment information to content provider 112 and/or without content provider 112 having to receive payment information from user 104.

Registration portal 602 may provide one or more service registration tools for access and use by content provider 112 to register to participate in the instant payment service. For example, registration portal 602 may provide tools for use by content provider 112 to agree to participate in the instant payment service and to provide information (e.g., bank account information for content provider 112) for use by network provider subsystem 118 to render payments to content provider 112.

Network provider subsystem 118 may receive registration information from content provider 12 by way of registration portal 602 and process the information to register content provider 112 and/or content provider subsystem 106 to participate in the instant payment service provided by network provider subsystem 118. As part of the registration, network provider subsystem 118 and/or network provider 116 may provide content provider 112 with information that may be used by content provider 112 and/or content provider subsystem 106 to participate in the service.

In certain embodiments, the information may include authentication information that may be used in the future by content provider subsystem 106 to authenticate to network provider subsystem 118. Content provider 112 may configure content provider subsystem 106 to use the authentication information to respond to an authentication challenge from network provider subsystem 118 with an appropriate challenge response. The authentication information may be provided to content provider 112 in any suitable way, including by way of registration portal 602.

In certain embodiments, network provider subsystem 118 may provide a code snippet to content provider 112 by way of registration portal 602. The code snippet may include data representing an agreed to arrangement between network provider 116 and content provider 112 for participation in the instant payment service.

In certain embodiments, the code snippet may include code configured to be used by access device 102 to provide an instant payment feature to user 104. When processed by access device 102, the code may direct access device 102 to generate and present an instant payment feature that may be selected by user 104 to initiate an instant payment to network provider 116.

Content provider 112 may add data representing the code snippet to content distributed by content provider subsystem 106. For example, content operator 12 may configure content provider subsystem 106 to insert data representing the code snippet into content distributed by content provider subsystem 106. To illustrate, content provider 112 may comprise a website operator that may configure content provider subsystem 106 to embed data representing the code snippet into one or more web pages of the website operated by content provider 112. To illustrate another example, content provider 112 may comprise an application publisher that may configure content provider subsystem 106 to embed the code snippet into an application and/or into application data provided by content provider subsystem 106.

In certain examples, content provider subsystem 106 may be configured to insert the code snippet into a web or application page that includes one or more different payment options for selection by user 104 to provide payment directly to content provider 112. For example, the page may include selectable options for user 104 to pay by credit card and/or bank account. In addition, the page may include an instant payment option that may be selected by user 104 to provide an instant payment to network provider 116 for a product offered for sale by content provider 112.

Accordingly, content transmitted by content provider subsystem 106 to access device 102 by way of data path 108 may include data representing the code snippet, and network provider subsystem 118 may be configured to detect and process the code snippet to provide an instant payment feature and/or service. The processing may include a network device 604 included in network provider subsystem 118 detecting the code snippet in a data flow from content provider subsystem 106 to access device 102 and using information included in the code snippet to modify content included in the data flow such that the data flow is configured to be processed by access device 102 to provide an instant payment feature to user 104 (e.g., as an instant payment option in a graphical user interface that may be selected by user 104 to initiate an instant payment to network provider 116).

In certain examples, at least some content included in the data flow from content provider subsystem 106 to access device 102 may be encrypted such that network device 604 is unable to inspect the encrypted content. The code snippet may be embedded within a non-encrypted portion of the data flow such that network device 604 is able to detect and process the code snippet.

In certain embodiments, network device 604 may activate an instant payment feature in a data flow by activating a code snippet embedded in the data flow. When activated, a code snippet, or at least a portion of a code snippet, is enabled such that it may be processed by a computing device. When not activated, the code snippet, or at least a portion of the code snippet, is not enabled such that it may not be processed (e.g., ignored) by a computing device. Thus, an "inactive" code snippet is disabled such that its contents would normally be ignored by a computing device, and an "active" code snippet is enabled such that its contents will be processed by a computing device. A code snippet or a portion thereof (e.g., specific code included in the code snippet) may be activated in any suitable way, such as by relabeling code included in the code snippet from comment type code to executable type code. For example, network device 604 may remove comment symbols that mark code in the code snippet as "commented code" such that when access device 102 receives and processes the data flow, the code previously marked as "commented code" will now be executed by access device 102 to cause access device 102 to present an instant payment option to user 104 (e.g., as a payment button, link, or other object within a browser page, application page, or other graphical user interface). As another example, a code snippet embedded in a data flow may comprise or consist of a marker that is configured to be detected and replaced with activated code by network device 604.

A user may select an instant payment option presented by access device 102 and, in response to the user selection of the instant payment option, access device 102 may generate and transmit a message directed to content provider subsystem 106 to indicate the user's 104 instruction to use the instant payment service to purchase a product. The message may include purchase information helpful to process the payment. For example, the message may indicate a purchase amount, product information, product quantity, and any other potentially helpful information. The message may be included within any data flow from access device 102 to content provider subsystem 106.

Inasmuch as network device 604 is positioned along data path 108, network device 604 may receive the purchase request message and detect and process the requested instant payment. The intention of user 104 to render an instant payment may be represented as an embedded code snippet in the message, and network device 604 may detect and process the code snippet. The code snippet may include any of the purchase information described above.

Network device 604 may be configured to use the purchase information in the message to process an instant payment transaction. To this end, network device 604 may be configured to leverage one or more billing processes and/or facilities of network provider subsystem 118 or other third party billing systems to bill subscribers to access network 114 (e.g., to bill user 104 for subscription access to access network 114 and/or one or more services provided over access network 114). For example, network provider subsystem 118 may include a billing facility 606 configured to bill subscribers for subscription access to mobile phone and/or data network services provided by network provider subsystem 118. For instance, billing facility 606 may be configured to issue a cellular phone bill (e.g., a recurring monthly bill) to user 104, which bill may include charges for subscription phone usage, messaging, data usage, etc associated with access network 114. Network device 604 may be configured to communicate with billing facility 606 and to leverage the processes and/or data of billing facility 606 to process an instant payment transaction.

To illustrate, network device 604 may use information included in the message received from access device 102 to identify user 104 and to add a charge for a purchase amount to user's 104 subscriber billing account with network provider 116. Accordingly, when user 104 receives a bill (e.g., a monthly bill) from network provider 116, the bill will include a charge for the instant payment transaction.

Network device 604 may be further configured to add a credit for the charge (less a service fee collected by network provider 116) to an account of content provider 112 with network provider 116. The credit may be applied at any suitable time and in any suitable way.

After processing the transaction, network device 604 may modify the upstream message from access device 102 to content provider subsystem 106 to include a payment result indication. The indication may be embedded within the message (e.g., within the upstream data flow carrying the message) and may indicate whether the payment succeeded or failed. In other words, the message may include a "payment success" indication or a "payment failure" indication. Network device 604 may then forward the modified upstream message data flow to content provider subsystem 106.

Content provider subsystem 106 may receive the message data flow and, based on the indication in the message, may either fulfill the purchase order by providing the purchased product to user 104 when the payment is marked as a successful payment or by canceling the purchase transaction when the payment is marked as an unsuccessful payment. Content provider subsystem 106 may provide a message to access device 102 to indicate the outcome of the instant payment transaction and/or the purchase order fulfillment (e.g., whether the purchase transaction has been fulfilled or canceled). Content provider 112 may receive payment for the product (less a service fee) from network provider 116 to complete the transaction.

In this or a similar manner, the purchase transaction may be completed without user 104 having to provide personal payment information to content provider 112 and without content provider having to receive and maintain personal payment information for user 104. This feature may lead to an increased number of purchase transactions with content provider 112 because a conventional barrier of a user having to provide personal payment information to a content provider to pay for a product has been removed.

Figure 7:
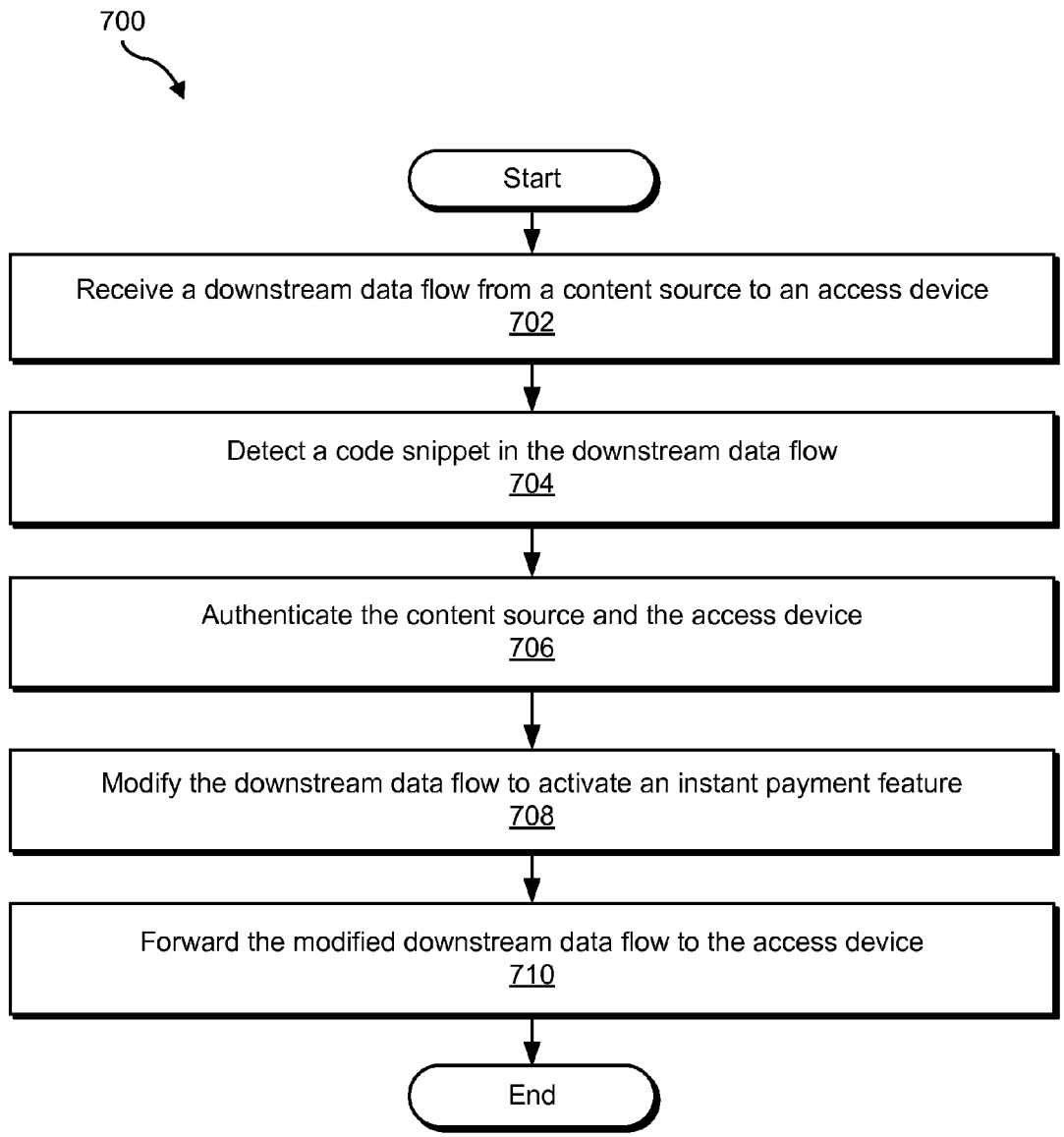
FIGS. 7-8 illustrate exemplary instant payment methods according to principles described herein.
Figure 8:
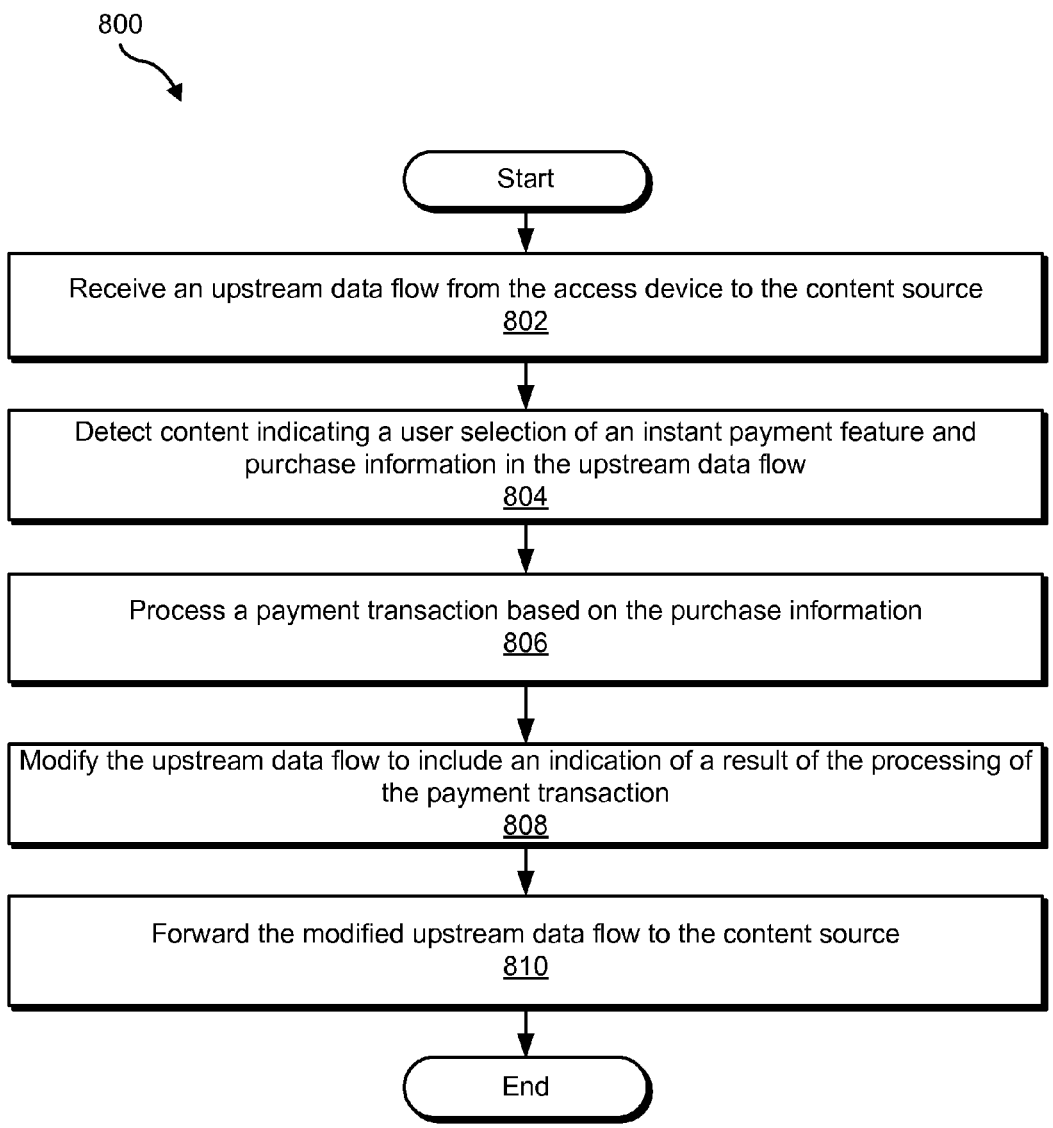

FIGS. 7-8 illustrate exemplary instant payment methods 700 and 800. While FIGS. 7-8 illustrate exemplary steps according to one embodiment, other embodiments may omit, add to, reorder, combine, and/or modify any of the steps shown in FIGS. 7-8. One or more of the steps shown in FIGS. 7-8 may be performed by network provider subsystem 118 and/or one or more components thereof.

In step 702 of method 700, network provider subsystem 118 receives a downstream data flow from a content source such as a content provider subsystem 106. As described above, the data flow may be transmitted by content provider subsystem 106 and directed to access device 102.

In step 704, network provider subsystem 118 detects a code snippet embedded in the downstream data flow. As described above, the code snippet may indicate that the data flow is associated with a content source, e.g., content provider subsystem 106, registered to participate in an instant payment service provided by network provider subsystem 118.

In step 706, network provider subsystem 118 authenticates the content source and the access device. For example, network provider subsystem 118 may authenticate content provider subsystem 106 and access device 102. The authentication may be performed in any suitable way. For example, network provider subsystem 118 may insert an authentication challenge into a data flow from access device 102 to content provider subsystem 106. Content provider subsystem 106 may use authentication information previously received from network provider 116 (e.g., as part of registration to participate in the instant payment service) to generate and insert a challenge response in a data flow message transmitted from content provider subsystem 106 to access device 102. Network provider subsystem 118 may extract the challenge response from the message and verify the identity of content provider subsystem 106. Network provider subsystem 118 may use a similar challenge mechanism to verify the identity of access device 102. Alternative authentication mechanisms may be used in other embodiments. For example, network provider subsystem 118 may verify the identity of access device 102 using techniques defined in Public Land Mobile Network ("PLMN") standards.

In step 708, network provider subsystem 118 modifies the downstream data flow to activate an instant payment feature. The modification may be performed in any of the ways described herein and may include activating code included in the code snippet for processing by access device 102. The activation may include relabeling code included in the code snippet, such as described herein.

In step 710, network provider subsystem 118 forwards the modified downstream data flow to the access device, such as described herein. The modified data flow is configured to be processed by the access device to present the instant payment feature to a user of the access device. For example, the access device may process the modified code snippet embedded in the modified downstream data flow to present a user-selectable instant payment option to the user.

As described herein, the user of the access device may select the instant payment option to initiate an instant payment. In response, the access device may embed content indicating the user selection of the instant payment option into an upstream data flow from the access device to content provider subsystem 106. Method 800 illustrated in FIG. 8 may be performed in response to the user selection of the instant payment option and the transmission of the upstream data flow including content indicating the user selection of instant payment option.

In step 802, network provider subsystem 118 receives an upstream data flow from the access device directed to the content source, i.e., content provider subsystem 106.

In step 804, network provider subsystem 118 detects content in the upstream data flow that indicates the user selection of the instant payment option and purchase information associated with the user selection of instant payment option, such as described herein.

In step 806, network provider subsystem 118 processes, in response to the detection in step 804, an instant payment transaction based on the purchase information included in the upstream data flow. The processing of the payment transaction may be performed in any of the ways described herein. For example, network provider subsystem 118 may leverage subscriber billing facility 606 to add a charge for the payment transaction to a service subscription bill associated with the user (e.g., a mobile phone service subscription bill maintained by network provider subsystem 118).

In step 808, network provider subsystem 118 modifies the upstream data flow to include an indication of a result of the processing of the instant payment transaction. As described herein, the indication of the result of the processing of the payment transaction may indicate a successful or a failed processing of the instant payment transaction.

In step 810, network provider subsystem 118 forwards the modified upstream data flow to the content source, i.e., content provider subsystem 106. The modified data flow is configured to be processed by content provider subsystem 106 to facilitate a fulfillment of an order for a product in response to an indication in the data flow of a successful processing of the instant payment transaction by network provider subsystem 118. For example, content provider subsystem 106 may send one or more messages to one or more order fulfillment facilities to initiate fulfillment of the order. As another example, content provider subsystem 106 may initiate a providing (e.g., a downloading) of a product in the form of digital content to the access device by way of data path 108 or by way of another data path. As described herein, the fulfillment of the order for the product may be performed without content provider subsystem 106 ever receiving or possessing payment information associated with the user of the access device.

In certain embodiments, network provider subsystem 118 uses the capability of modifying data flows between access device 102 and content provider subsystem 106 to communicate with access device 102 and content provider subsystem 106 without the need for separate, explicit, directed message exchanges with access device 102 or content provider subsystem 106. By leveraging normal data flows between access device 102 and content provider subsystem 106 to communicate with access device 102 and content provider subsystem 106, network provider subsystem 118 is able to communicate with access device 102 and content provider subsystem 106 without generating additional separate, directed communications and without increasing demands on resources (e.g., bandwidth resources) of access network 114 with separate, directed communications.

Figure 9:
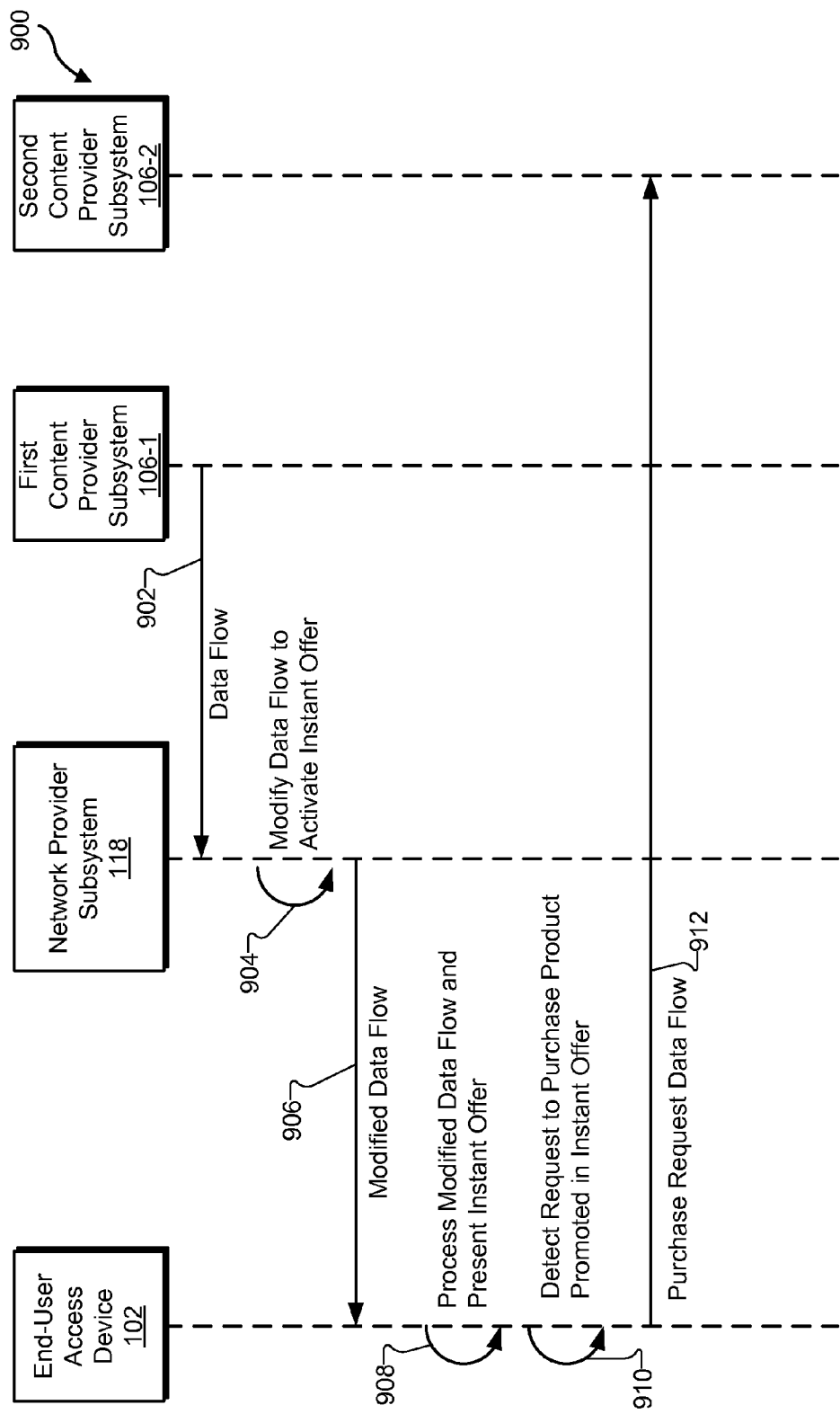
FIGS. 9-10 illustrate exemplary methods of facilitating instant commerce by way of a data path according to principles described herein.
Figure 10:
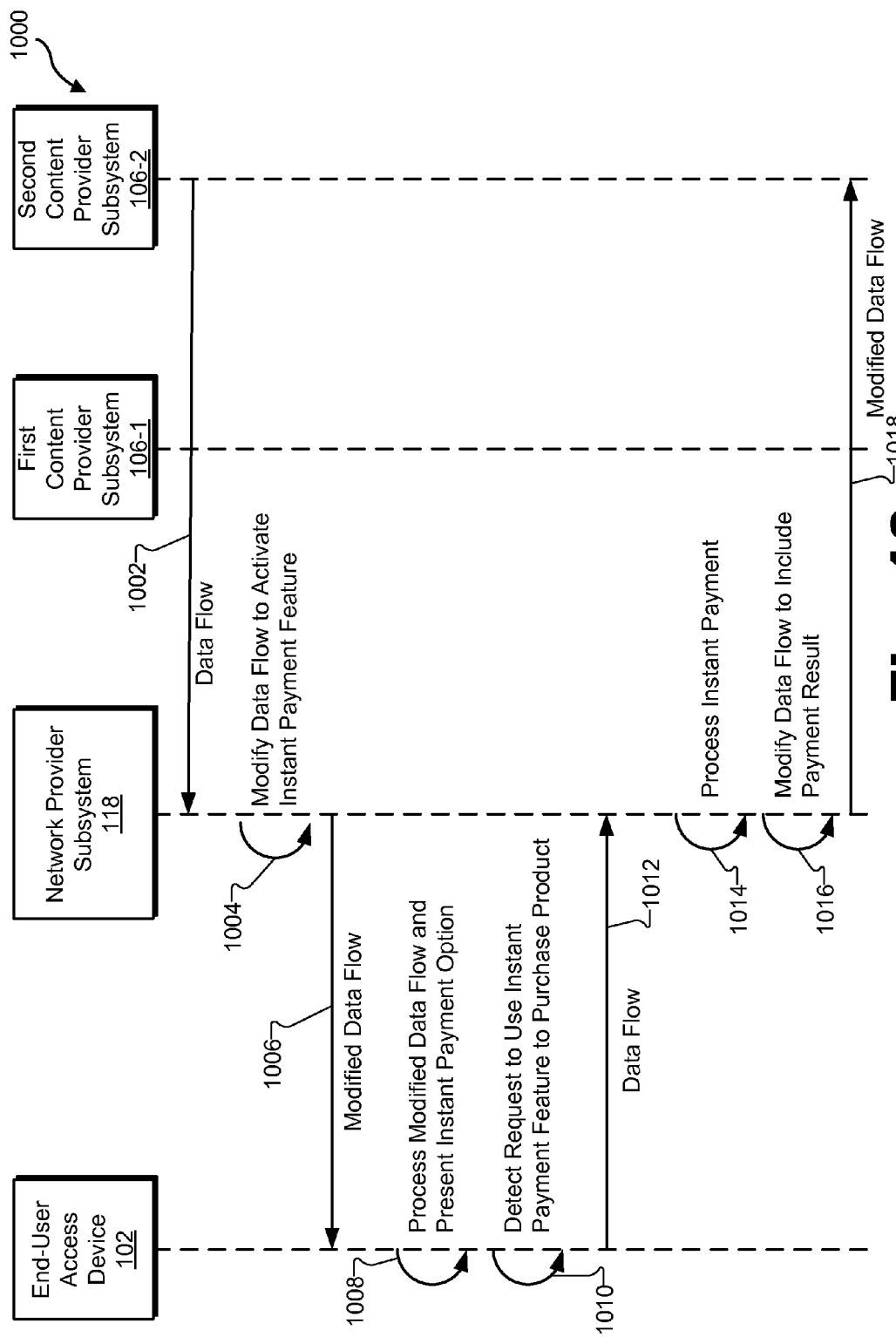

FIGS. 9-10 illustrate exemplary methods 900 and 1000 facilitating instant commerce by way of a data path. In step 902 of method 900, a first content provider subsystem 106-1 may transmit a data flow directed to access device 102. The data flow may include data representative of content such as web content, application content, social networking content, and/or any other content that may be transmitted by content provider subsystem 106-1 and directed to access device 102.

In step 904, network provider subsystem 118 receives, detects, and modifies the data flow to activate an instant offer, such as described herein. In step 906, network provider subsystem 118 forwards the modified data flow with the active instant offer to access device 102, such as described herein.

In step 908, access device 102 processes the modified data flow and presents the instant offer to user 104 of access device 102, such as described herein. User 104 may view the instant offer and want to purchase a product promoted by the instant offer. Accordingly, user 104 may provide input to access device 102 to indicate the user's desire to purchase the product. In step 910, access device 102 detects the input as a request from user 104 to purchase the product.

In step 912, access device 102 transmits a data flow that includes data representing the purchase request to a second content provider subsystem 106-2, which may be operated by a seller of the product promoted by the instant offer (e.g., by offer provider 406). Method 1000 illustrated in FIG. 10 may be performed in response to content provider subsystem 106-2 receiving the purchase request data flow from access device 102.

In step 1002, second content provider subsystem 106-2 transmits a data flow directed to access device 102. The data flow may include data representative of content such as web content, application content, social networking content, and/or any other content that may be transmitted by content provider subsystem 106-2 and directed to access device 102. When step 1002 is performed in response to content provider subsystem 106-2 receiving the purchase request data flow of step 912 of method 900, the data flow of step 1002 may include content representing one or more payment options for selection by user 104 to choose a method of payment for a product being offered for sale by an operator of content provider subsystem 106-2. Content provider subsystem 106-2 may be registered to participate in an instant payment service provided by network provider subsystem 118 and one of the payment options included in the data flow of step 1002 may be an instant payment option.

In step 1004, network provider subsystem 118 receives, detects, and modifies the data flow to activate an instant payment feature, such as described herein. In step 1006, network provider subsystem 118 forwards the modified data flow with the active instant payment feature to access device 102, such as described herein.

In step 1008, access device 102 processes the modified data flow and presents an instant payment option to user 104 of access device 102, such as described herein. User 104 may view the instant payment option (within the context of a number of selectable payment options) and select the instant payment option to express a desire to use the instant payment service to render payment for the associated product. In step 1010, access device 102 detects the input as a request from user 104 to use the instant payment feature and/or service to purchase the product.

In step 1012, access device 102 transmits a data flow that includes content indicating the user selection of the instant payment feature and purchase information associated with the user selection of the instant payment feature to content provider subsystem 106-2. In step 1014, network provider subsystem 118 receives the data flow of step 1012, detects the content indicating the user selection of the instant payment feature, and processes an instant payment transaction based on the purchase information included in the data flow of step 1012. The instant payment transaction may be processed in any of the ways described herein.

In step 1016, network provider subsystem 118 modifies the data flow of step 1012 to include an indication of a result of the processing of the instant payment transaction, such as described herein. In step 1018, network provider subsystem 118 forwards the modified data flow with the indication of the payment result to content provider subsystem 106-2, which is configured to cancel the purchase order or fulfill the purchase order based on the indicated failure or success of the processing of the instant payment transaction, such as described herein.

To illustrate one specific example, content provider subsystem 106-1 may comprise a web content server that provides a data flow containing web content (e.g., a web page or a social networking page) to access device 102 in step 902 of FIG. 9. Network provider subsystem 118 may modify the data flow to activate an instant offer and forward the modified data flow to access device 102 in steps 904 and 906, respectively. Access device 102 may process the data flow and present the instant offer to user 104. The instant offer may offer half-price movie tickets to a movie showing at a particular time and location. User 104 may provide input to indicate a desire to use the offer to purchase the discounted movie tickets. In response, access device 102 may generate and transmit a data flow to content provider subsystem 106-2, which may comprise a ticket server and may be operated by the theater operator that provided the instant offer or by another entity.

The ticket server may receive the data flow of step 912 and generate and provide a data flow containing payment options to access device 102 in step 1002 of FIG. 10. Network provider subsystem 118 may modify the data flow to activate an instant payment feature and forward the modified data flow to access device 102 in steps 1004 and 1006, respectively. Access device 102 may process the data flow and present an instant payment option to user 104. User 104 may provide input to select the instant payment option. In response, access device 102 may detect the user selection of the instant payment option and transmit a data flow containing content indicating the user selection and purchase information to the ticket server in step 1012. In step 1014, network provider subsystem 118 may receive the data flow of step 1012, detect the content indicating the user selection of the instant payment feature, and process an instant payment transaction based on the purchase information included in the data flow of step 1012. The instant payment transaction may be processed in any of the ways described herein.

Network provider subsystem 118 may then modify the data flow of step 1012 to include an indication of a result of the processing of the instant payment transaction in step 1016, such as described herein and forward the modified data flow with the indication of the payment result to the ticket server in step 1018. The ticket server may cancel or fulfill the movie ticket purchase order based on the indicated failure or success of the processing of the instant payment transaction included in the data flow, such as described herein.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 11:
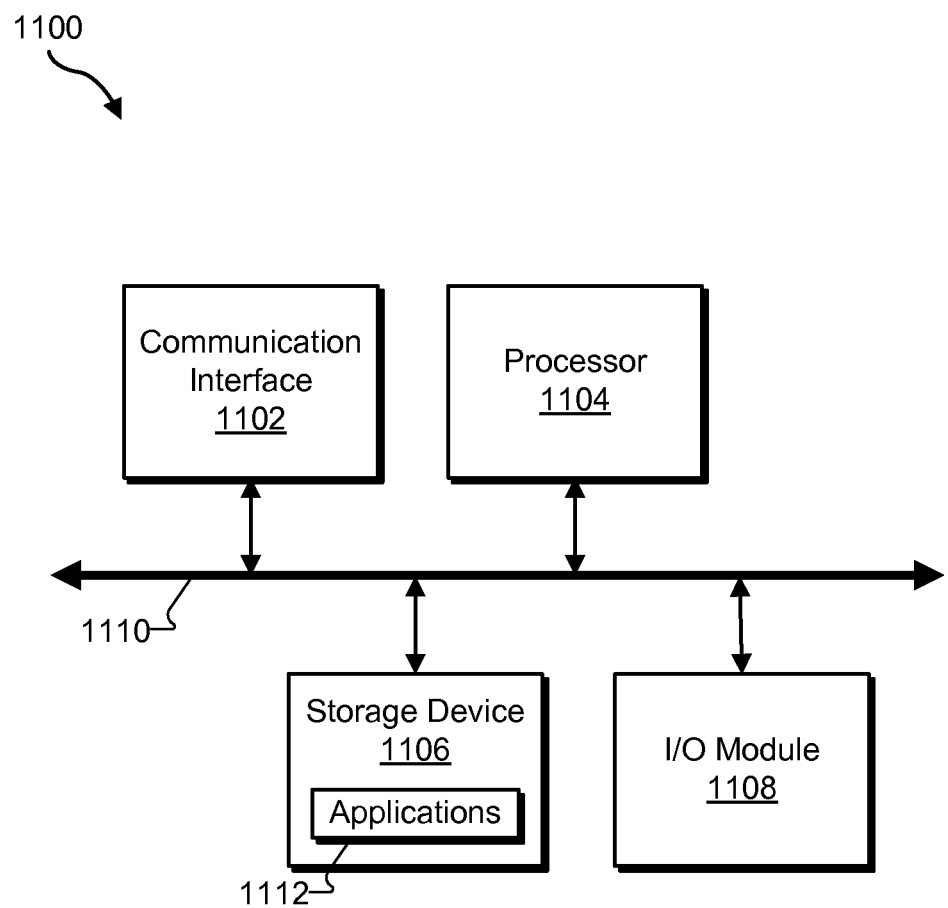
FIG. 11 illustrates an exemplary computing device according to principles described herein.

FIG. 11 illustrates an exemplary computing device 1100 that may be configured to perform one or more of the processes described herein. As shown in FIG. 11, computing device 1100 may include a communication interface 1102, a processor 1104, a storage device 1106, and an input/output ("I/O") module 1108 communicatively connected via a communication infrastructure 1110. While an exemplary computing device 1100 is shown in FIG. 11, the components illustrated in FIG. 11 are not intended to be limiting. Additional or alternative components may be used in other embodiments. Components of computing device 1100 shown in FIG. 11 will now be described in additional detail.

Communication interface 1102 may be configured to communicate with one or more computing devices. Examples of communication interface 1102 include, without limitation, a wired network interface (such as a network interface card), a wireless network interface (such as a wireless network interface card), a modem, an audio/video connection, and any other suitable interface.

Processor 1104 generally represents any type or form of processing unit capable of processing data or interpreting, executing, and/or directing execution of one or more of the instructions, processes, and/or operations described herein. Processor 1104 may execute and/or direct execution of operations as directed by one or more applications 1112 (which may include one or more software applications 102 included in suite 100) or other computer-executable instructions such as may be stored in storage device 1106 or another computer-readable medium.

Storage device 1106 may include one or more data storage media, devices, or configurations and may employ any type, form, and combination of data storage media and/or device. For example, storage device 1106 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1106. For example, data representative of one or more executable applications 1112 configured to direct processor 1104 to perform any of the operations described herein may be stored within storage device 1106. In some examples, data may be arranged in one or more databases residing within storage device 1106.

I/O module 1108 may be configured to receive user input and provide user output and may include any hardware, firmware, software, or combination thereof supportive of input and output capabilities. For example, I/O module 1108 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1108 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1108 is configured to provide graphical data to a display for presentation to a user. The graphical data may be representative of one or more graphical user interfaces and/or any other graphical content as may serve a particular implementation.

In some examples, any of the systems and/or system components described herein may be implemented by or within one or more components of computing device 1100. For example, one or more applications 1112 residing within storage device 1106 may be configured to direct processor 1104 to perform one or more processes or functions described herein. Additionally or alternatively, storage device 1106 may store any of the data described herein.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
  receiving, by a network provider subsystem positioned along a data path between an access device and a content provider subsystem, a downstream data flow transmitted by the content provider subsystem to the access device by way of the data path;
  detecting, by a network provider subsystem, a code snippet embedded in the downstream data flow;
  modifying, by the network provider subsystem based on the code snippet embedded in the downstream data flow, content included in the downstream data flow to activate an instant offer; and
  forwarding, by the network provider subsystem, the modified downstream data flow to the access device, the modified downstream data flow configured to be processed by the access device to present the instant offer to a user of the access device.

2. The method of claim 1, wherein the instant offer comprises a location-specific and time-sensitive offer for a product.

3. The method of claim 2, further comprising:
  providing, by the network provider subsystem, an instant offer publishing portal;
  receiving, by the network provider subsystem, data representing the instant offer from an offer provider by way of the instant offer publishing portal; and
  storing the data representing the instant offer in a repository of instant offers;
  wherein the instant offer is defined by the offer provider to be valid for a predefined time period that begins with the network provider subsystem receiving the data representing the instant offer.

4. The method of claim 1, further comprising:
  providing, by the network provider subsystem, an instant offer publishing portal;
  receiving, by the network provider subsystem, data representing one or more offer distribution conditions for the instant offer from an offer provider by way of the instant offer publishing portal;
  determining, by the network provider subsystem, a targetable audience of users based on the offer distribution conditions and current network status information maintained by network provider subsystem; and
  providing, by the network provider subsystem, information about the targetable audience of users to the offer provider in real time by way of the instant offer publishing portal.

5. The method of claim 4, further comprising:
    determining, by the network provider subsystem, a rate to charge for distribution of the instant offer based on the targetable audience; and
    providing, by the network provider subsystem, information about the rate to the offer provider in real time by way of the instant offer publishing portal.

6. The method of claim 1, wherein the code snippet embedded in the data flow specifies one or more offer selection conditions agreed to by a network provider operating the network provider subsystem and a content provider operating the content provider subsystem to govern selection of instant offers by the network provider subsystem for distribution with content provided by the content provider subsystem.

7. The method of claim 6, wherein the modifying comprises selecting the instant offer for activation in the data flow based on the one or more offer selection conditions specified by the code snippet embedded in the data flow.

8. The method of claim 1, further comprising:
    providing, by the network provider subsystem, an instant offer publishing portal; and
    receiving, by the network provider subsystem, data representing one or more offer distribution conditions for the instant offer from an offer provider by way of the instant offer publishing portal;
    wherein the modifying comprises selecting the instant offer for activation in the data flow based at least in part on a current geographic location of the access device, wherein the current geographic location of the access device satisfies the one or more offer distribution conditions for the instant offer.

9. The method of claim 1, further comprising:
    providing, by the network provider subsystem, an instant offer publishing portal; and
    receiving, by the network provider subsystem, data representing one or more offer distribution conditions for the instant offer from an offer provider by way of the instant offer publishing portal;
    wherein the modifying comprises selecting the instant offer for activation in the data flow based at least in part on a current processing activity of the access device, wherein the current processing activity of the access device satisfies the one or more offer distribution conditions for the instant offer.

10. The method of claim 9, wherein the current processing activity of the access device comprises at least one of executing a specified application and accessing specified content.

11. The method of claim 9, wherein the modifying further comprises determining the current processing activity of the access device based on network data traffic associated with the access device.

12. The method of claim 1, wherein the modifying comprises embedding data representing the instant offer in the data flow.

13. The method of claim 1, embodied as computer-executable instructions on at least one non-transitory computer-readable medium.

14. A method comprising:
    receiving, by a network provider subsystem positioned along a data path between an access device and a content provider subsystem, a downstream data flow transmitted by the content provider subsystem to the access device by way of the data path;
    detecting, by the network provider subsystem, a code snippet embedded in the downstream data flow;
    modifying, by the network provider subsystem in response to the detecting of the code snippet embedded in the downstream data flow, the downstream data flow to activate an instant payment feature; and
    forwarding, by the network provider subsystem, the modified downstream data flow to the access device, the modified downstream data flow configured to be processed by the access device to present the instant payment feature to a user of the access device.

15. The method of claim 14, further comprising:
    receiving, by the network provider subsystem, an upstream data flow transmitted by the access device to the content provider subsystem by way of the data path;
    detecting, by the network provider subsystem in the upstream data flow, content indicating a user selection of the instant payment feature and purchase information associated with the user selection of the instant payment feature;
    processing, by the network provider subsystem in response to the detecting of the content indicating the user selection of the instant payment feature, a payment transaction based on the purchase information;
    modifying, by the network provider subsystem, the upstream data flow to include an indication of a result of the processing of the payment transaction; and
    forwarding, by the network provider subsystem, the modified upstream data flow including the indication of the result of the processing of the payment transaction to the content provider subsystem.

16. The method of claim 15, wherein the processing of the payment transaction based on the purchase information comprises adding a charge for the payment transaction to a service subscription bill associated with the user.

17. The method of claim 16, wherein the service subscription bill comprises a mobile phone service subscription bill maintained by the network provider subsystem.

18. The method of claim 15, wherein:
    the indication of the result of the processing of the payment transaction indicates a successful processing of the payment transaction; and
    the method further comprises facilitating, by the content provider subsystem in response to the indication of the successful processing of the payment transaction included in the modified upstream data flow, a fulfillment of an order for a product without the content provider subsystem receiving or possessing payment information associated with the user.

19. The method of claim 14, further comprising processing, by the access device, the code snippet embedded in the modified downstream data flow to present a user-selectable instant payment option to the user.

20. The method of claim 14, wherein the modifying of the downstream data flow comprises relabeling comment type code included in the code snippet to executable type code.

21. The method of claim 20, wherein the relabeling comprises removing one or more comment symbols from the code snippet.

22. The method of claim 14, embodied as computer-executable instructions on at least one non-transitory computer-readable medium.

23. A method comprising:
    receiving, by a network provider subsystem, a downstream data flow transmitted by a content provider subsystem to an access device;
    detecting, by a network provider subsystem, a code snippet embedded in the downstream data flow;

modifying, by the network provider subsystem based on the code snippet embedded in the downstream data flow, content included in the downstream data flow to activate an instant offer;

forwarding, by the network provider subsystem, the modified downstream data flow to the access device, the modified downstream data flow configured to be processed by the access device to present the instant offer to a user of the access device;

receiving, by the network provider subsystem, an additional downstream data flow transmitted by an additional content provider subsystem to the access device;

detecting, by the network provider subsystem, an additional code snippet embedded in the additional downstream data flow;

modifying, by the network provider subsystem in response to the detecting of the additional code snippet embedded in the additional downstream data flow, the additional downstream data flow to activate an instant payment feature;

forwarding, by the network provider subsystem, the modified additional downstream data flow to the access device, the modified additional downstream data flow configured to be processed by the access device to present the instant payment feature to the user of the access device;

receiving, by the network provider subsystem, an upstream data flow transmitted by the access device to the additional content provider subsystem;

detecting, by the network provider subsystem in the upstream data flow, content indicating a user selection of the instant payment feature and purchase information associated with the user selection of the instant payment feature;

processing, by the network provider subsystem in response to the detecting of the content indicating the user selection of the instant payment feature, an instant payment transaction based on the purchase information;

modifying, by the network provider subsystem, the upstream data flow to include an indication of a result of the processing of the instant payment transaction; and forwarding, by the network provider subsystem, the modified upstream data flow including the indication of the result of the processing of the instant payment transaction to the additional content provider subsystem.

24. A system comprising:

at least one network device included in a network provider subsystem that provides an access device with access to a content processing subsystem by way of an access network, the at least one network device configured to:

receive a downstream data flow from the content provider subsystem and directed to the access device by way of the access network;

detect a code snippet embedded in the downstream data flow;

modify, based on the code snippet embedded in the downstream data flow, content included in the downstream data flow to activate at least one of an instant offer and an instant payment feature; and forward the modified downstream data flow to the access device, the modified downstream data flow configured to be processed by the access device to present the at least one of the instant offer and the instant payment feature to a user of the access device.

* * * * *